Dec. 28, 1965

D. W. FURMAN 3,226,546

NUCLEAR BLAST AND OVERPRESSURE
DETECTION AND RECORDING SYSTEM

Filed Dec. 3, 1962

INVENTOR
Daniel W. Furman
BY
Blair + Buckles
ATTORNEYS

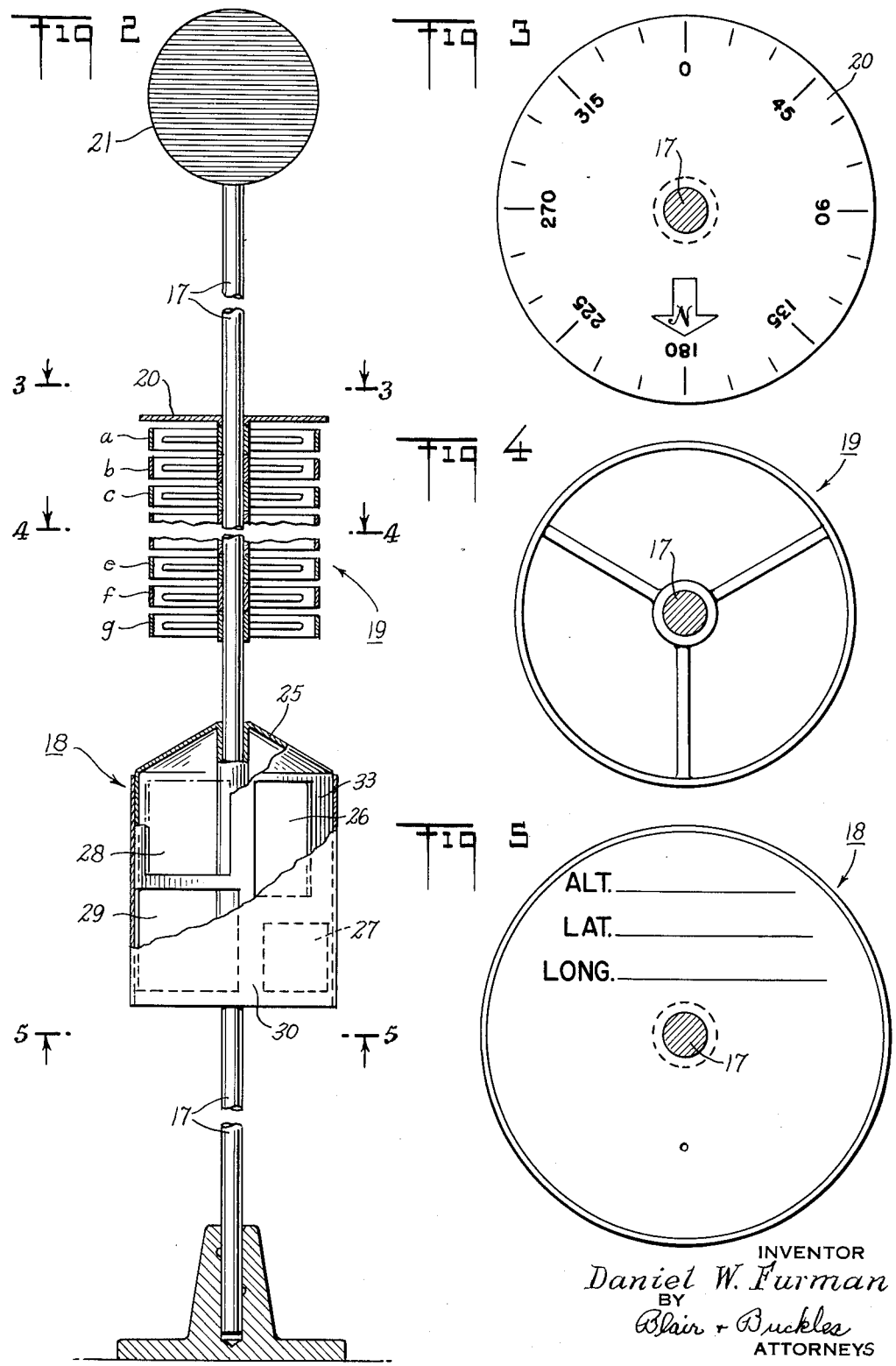

Dec. 28, 1965  D. W. FURMAN  3,226,546
NUCLEAR BLAST AND OVERPRESSURE
DETECTION AND RECORDING SYSTEM

Filed Dec. 3, 1962  3 Sheets-Sheet 3

INVENTOR
Daniel W. Furman
BY
Blair + Buckles
ATTORNEYS

United States Patent Office 3,226,546
Patented Dec. 28, 1965

3,226,546
NUCLEAR BLAST AND OVERPRESSURE DETECTION AND RECORDING SYSTEM
Daniel W. Furman, Stamford, Conn., assignor to Dunlap and Associates, Inc., Stamford, Conn.
Filed Dec. 3, 1962, Ser. No. 241,817
2 Claims. (Cl. 250—83)

This invention relates to a method and apparatus for determining the location and magnitude of nuclear detonations, and more particularly to a device and system for indicating weapon yield, burst height, and the location of ground zero of a nuclear explosion.

It is important for purposes of military and civil defense that any atomic explosion detonated over inhabited areas, as might occur for example from an enemy bomber or missile, be promptly located and evaluated so that proper and adequate remedial action may be taken without undue delay or confusion. For this purpose it is necessary that a measure of the size of the explosion, its height and location be determined promptly so that necessary fire fighting equipment, ambulances and rescue crews can be dispatched to the afflicted area. Heretofore it has been proposed to employ automatic electronic detectors, connected into an elaborate electrical communications network, for the purpose of transmitting such information to a central headquarters. Such prior art systems, requiring complicated apparatus, were costly to build and maintain. Furthermore, such prior systems might be rendered inoperative by the very blast which they were intended to detect.

Accordingly, it is an object of this invention to provide a fool-proof, indestructible, method of detecting, locating and measuring a nuclear detonation.

A further object of the invention is to provide an inexpensive passive detection device for use in practicing the above method.

Another object of the invention is to provide a system employing a plurality of such detection devices for accurately determining the weapon yield, burst height, and location of ground zero of a nuclear detonation.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIGURE 2 is a profile view, partly in section, of a detection device according to the invention;

FIGURE 3 is a top sectional view taken along the line 3—3 of FIGURE 2, showing the azimuth angle detecting portion of the device;

FIGURE 4 is a sectional view taken along the line 4—4 of FIGURE 2, showing the supports for the radiation measuring elements of the device;

FIGURE 5 is a bottom sectional view taken along the line 5—5 of FIGURE 2, showing the unit identification means mounted on the pressure sensing portion of the detection device;

The purpose of the nuclear bomb detection system of the invention is not to be confused with ballistic missile early warning systems which employ long range radar to detect missile launches, or other warning systems which may provide as much as fifteen minutes advance notice of impending missile attack. The detection system of the present invention is intended to provide immediate notice of a nuclear attack which may have evaded the radar nets, such as a submarine launched missile. Additionally, the system employing a plurality of blast detectors according to the present invention will provide military and civil defense commanders with all of the essential information needed to determine quickly and with the requisite accuracy not only the areas under attack but also the specific location, height and magnitude of an atomic bomb blast.

Figure 1:
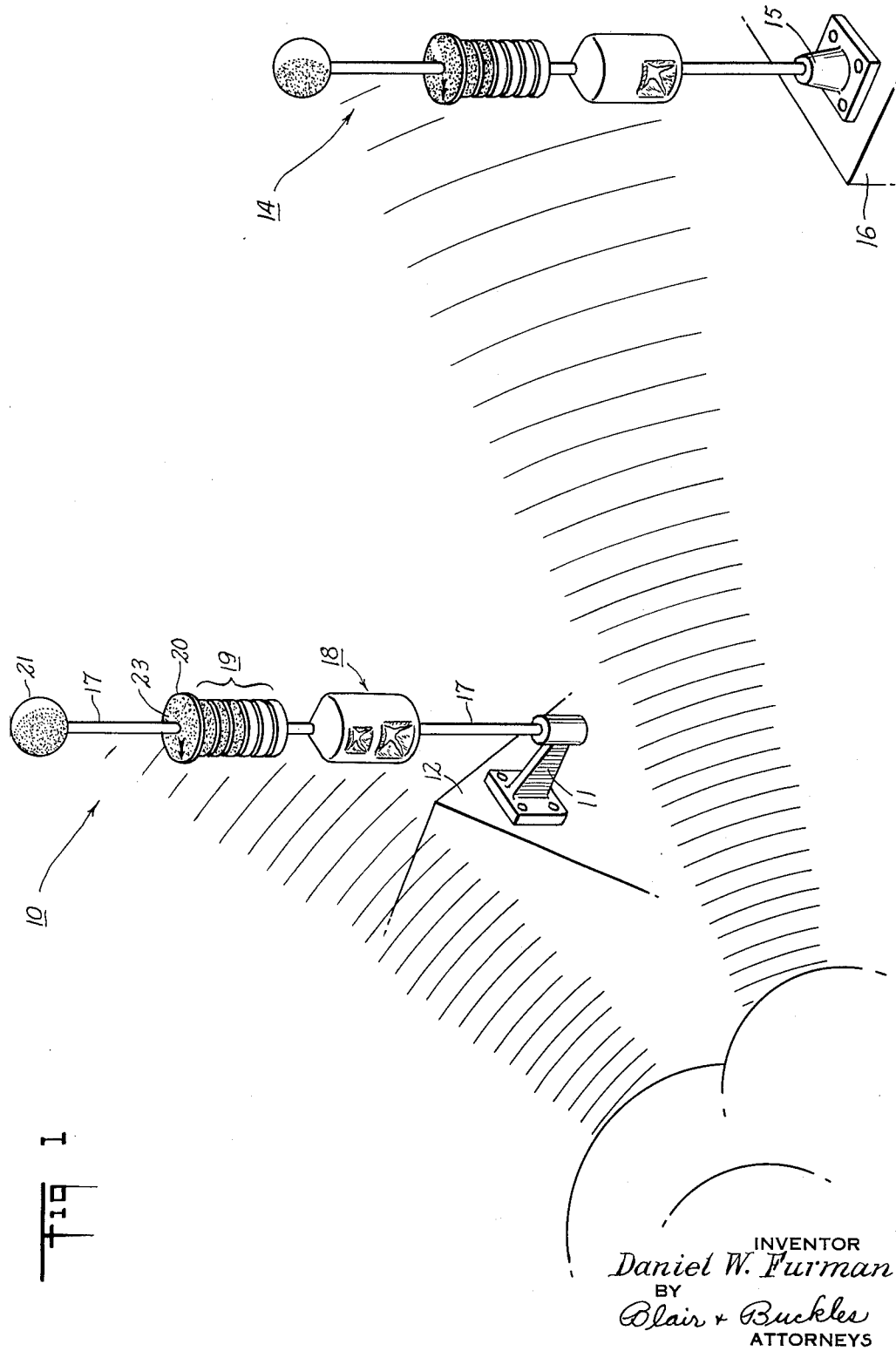
FIGURE 1 is a perspective view showing two detection devices according to the invention, installed at different locations within range of a nuclear detonation.

Referring now to FIGURE 1 of the drawings, a first blast detector indicated generally at 10 is shown mounted vertically upon an angle bracket 11 which is attached to the gable of a house or other building 12. A second blast detector indicated generally at 14 is mounted by a bracket 15 to the roof top of another building structure 16. The detectors 10 and 14 are preferably separated from each other by at least several thousand feet, or even by miles. The actual distance between detectors is not critical but it is important that the exact location of each installation be known, and for this purpose provision is made for recording the location data on a protected underside portion of each detector as shown in FIGURE 5. It is also desirable that the blast detectors of the invention be installed in elevated locations, such as roof tops, which are readily accessible to survivors so that the devices can be conveniently removed from their mountings after a blast and brought to a fallout shelter so that the information contained thereon can be transmitted to a central command headquarters for prompt evaluation. For this reason the mounting brackets, such as 11 and 15 in FIGURE 1, are preferably of the bayonet type so that the vertical supporting rod 17 may be easily removed from a mounting by a simple twist of the wrist.

Still referring to FIGURE 1, it will be seen that the detector 10 comprises a vertical mounting rod 17 which is preferably of durable metal, such as iron or steel. Mounted on the rod 17 is a blast pressure detection device 18 above which are mounted a plurality of thermal radiation detection rings 19 having immediately above them, coaxially mounted on the rod 17, an azimuth angle detection disc 20. A sphere 21 is mounted at the very top end of rod 17 and functions as an elevation angle detector as will be more fully described hereinafter.

Referring now to FIGURE 2, it may be seen that the sphere 21 is inscribed with a number of parallel circles on its surface, each circle lying in a horizontal plane normal to the vertical axis of supporting rod 17. These circles inscribed on the surface of sphere 21 correspond to elevation (and depression) angles with respect to the horizontal plane passed through the center of the sphere. The sphere 21 is formed of a low heat absorptive material, such as wood or molded plastic. Suitable plastics for this purpose are melamine formaldehyde filled, or a molded phenol formaldehyde which may be either mineral filled or macerated fabric filled.

The surface of sphere 21 is coated with a fire resistant heat sensitive substance which will indicate the receipt of a thermal pulse from a nuclear detonation. Suitable paints for this purpose are available commercially and may be obtained from the Tempil Corporation, among other suppliers. The indication of elevation angle from the detector to an atomic blast is recorded on the sphere 21 by a simple charring, or a color change, of the surface coating. The degree of charring is not important to the function of this device. The incident radiation from a nuclear blast will char that area of the ball 21 whose tangent is perpendicular to the direction of the thermal energy, but will not appreciably affect the remaining surface of the ball. This small area of the sphere 21 which is intensely charred or discolored provides a record indication of the angle of elevation from the detector to the fire ball of the explosion.

The azimuth angle indication to the ground zero point beneath the nuclear blast is recorded on the surface of disc 20 by the protective shadow which is cast by supporting rod 17. By initially orienting the disc 20 with its 180 degree mark pointing to the north when the detector is installed, the azimuth angle will be recorded directly on the disc 20 by the shadow of rod 17, as shown at 23 in FIGURE 1. The disc 20 is also formed of a material which is a reasonably good heat insulator, such as wood, glass, ceramic, or one of the plastics with a high melting point such as those mentioned above in reference to the material from which the ball 21 is formed. The top surface of the disc 20 is also coated with a heat sensitive material similar to that used on the surface of the sphere 21, and it is also inscribed with the points of the compass as shown in FIGURE 3 of the drawings. An arrow inscribed on the surface of the disc 20 in alignment with the 180° mark is pointed to the north when the device is installed. Thus, when a thermal pulse from a nuclear detonation is incident upon the device, the rod 17 shields part of the surface of the disc 20 so that the entire surface of the disc except that shielded by the rod is exposed to the incident heat wave and thereby discolored. In this manner the shadow of the rod is imprinted upon the disc and it gives a true record of the angle from the detection device to the point of detonation.

Still referring to FIGURE 2, it will be seen that a plurality of separate coaxial ring members generally designated as 19 are mounted on the rod 17 beneath the disc 20. The exterior surface of each of the rings 19 is coated with a material which is responsive to a different range of temperatures. The rings 19 are preferably constructed of metal which is a good heat conductor so that the surface temperature of each ring does not significantly exceed the temperature throughout the ring during the incident thermal pulse resulting from a nuclear detonation. It is desirable that the cylindrical walls of the rings 19 be as thin as practicable in order to reduce the mass of each ring and to hold its heat absorption to a low value. For this reason, I prefer to make the thermal radiation sensitive rings 19 of aluminum, ranging in thickness from .0025 to .010 inch.

The particular value of thermal radiation at which the coating material on the external surface of the rings 19 shows an indication is determined by the maximum temperature to which the ring material is raised. This temperature is determined by the specific heat of the ring material, the thickness of the ring material, and the characteristics of the coating applied to the surface. The relationship governing the temperature change of a ring, such as the rings $a$ through $g$ shown in FIGURE 2, due to an incident thermal pulse is as follows:

(1) $$t = \frac{q}{\pi^{\text{dhs}}}$$

Where:

$q$ = calories per square centimeter of heat incident upon the ring
$d$ = density of the ring material in grams per cubic centimeter
$h$ = thickness of material in centimeters
$s$ = specific heat of the material in calories/gram/degree centigrade
$t$ = change in temperature of the ring in degrees centigrade It can be seen from Equation 1 that for a given amount of incident heat the change in temperature is increased by decreasing material density, thickness, or specific heat. An illustration will be given hereafter to show that several readily available materials can be used to construct the rings, but before considering this illustration the material used to coat the rings and sense the thermal radiation will be discussed.

As each separate ring, designated $a$ through $g$ in FIGURE 2, is coated with a different heat sensitive material responsive to a different range of threshold temperatures, ranging from a low temperature of approximately 115° to the maximum temperature of approximately 315°, the number of discolored rings and their position in the array following a nuclear detonation provides an accurate record of the incident thermal radiation. Referring again briefly to FIGURE 1, it will be seen that the detector designated 10, which is closer to the thermal nuclear detonation suggested in the lower left hand corner of the figure, has the top three of its rings 19 discolored, whereas the detector 14 located at a greater distance from the ground zero of detonation has only its two uppermost rings disclored because it has received less thermal radiation from the explosion.

As noted above, the temperature of the rings 19 is determined by the quantity of heat contained in the thermal pulse incident upon each ring, the density, thickness, and specific heat of the material used in constructing the rings. Three materials, and their pertinent physical properties, which may be used in constructing the rings are shown in Table 1, as follows:

Table 1.—Materials for constructing temperaturing sensing rings

| Materials | Density (gms./cc.) | Specific heat (cal./gm., ° C.) |
|---|---|---|
| Wrought iron | 7.86 | .117 |
| Aluminum | 2.70 | .23 |
| Magnesium | 1.74 | .26 |
| Copper | 8.89 | .095 |

Employing the data shown in Table 1 in Equation 1 gives the following relationship between change in temperature (degrees centigrade) and the incident thermal radiation (calories/square centimeter):

(2)       Wrought iron—$q = .072 \Delta t$
(3)       Aluminum—$q = .044 \Delta t$
(4)       Magnesium—$q = .033 \Delta t$
(5)       Copper—$q = .060 \Delta t$ Temperature sensitive paints suitable for coating of the rings 19, the azimuth disc 20, and the elevation sphere 21, can be made by mixing equal parts by weight of cuprous iodide and mercuric chloride, grinding the mix to a fine powder and adding a thin, light colored, non-acid oil. By selectively varying these proportions, paints sensitive to different temperature ranges can be prepared. However, very satisfactory materials for this purpose are available commercially, and as shown in Table 2, these materials, identified by catalog numbers of the Tempil Corporation, are listed in selected combinations with rings made of aluminum (which I prefer) to provide twenty different radiant ranges for sensing thermal radiation ranging between .25 calory per square centimeter and 7.80 calories per square centimeter. Table 2 also includes a scale of ambient temperatures for each of the selected combinations of materials, as well as the indicating temperature of each combination.

ever, which is closer to the nuclear detonation has both its first and second ports ruptured, indicating that the overpressure at this location reached one-half pound per square inch.

A detection system according to the invention employs a plurality of these detection devices at strategic locations throughout the nation employing it. In use of the system, following a nuclear detonation, survivors in the locality where the detectors are installed seize the device and take it with them to a shelter area where a civil defense worker, or anyone else, transmits the data recorded on the detector to a central control position for Table 2

| Ring Number | Ring material, Aluminum | | Indicating temperature (° F.) | Thermal radiation (cal./cm.²) required for indication at ambient temperatures as shown | | |
|---|---|---|---|---|---|---|
| | Thickness of ring material (inches) | Tempilstik sensing substance coating outside surface of rings | | 0° F. | 40° F. | 70° F. |
| 1 | 0.0025 | −12610E | 113 | 0.70 | 0.45 | 0.25 |
| 2 | 0.005 | −12610E | 113 | 1.40 | 0.90 | 0.50 |
| 3 | 0.005 | −25802D | 138 | 1.70 | 1.20 | 0.80 |
| 4 | 0.010 | −12610E | 113 | 2.75 | 1.80 | 1.05 |
| 5 | 0.010 | −12711E | 125 | 3.05 | 2.10 | 1.35 |
| 6 | 0.010 | −25802D | 138 | 3.40 | 2.40 | 1.65 |
| 7 | 0.010 | −13821D | 150 | 3.65 | 2.70 | 1.95 |
| 8 | 0.010 | −14107E | 163 | 4.00 | 3.00 | 2.25 |
| 9 | 0.010 | −14911E | 175 | 4.25 | 3.30 | 2.55 |
| 10 | 0.010 | −10311G | 188 | 4.60 | 3.60 | 2.85 |
| 11 | 0.010 | −11429E | 200 | 4.85 | 3.90 | 3.15 |
| 12 | 0.010 | −12812D | 213 | 5.20 | 4.20 | 3.50 |
| 13 | 0.010 | −11513D | 225 | 5.45 | 4.50 | 3.80 |
| 14 | 0.010 | −272042 | 238 | 5.80 | 4.80 | 4.10 |
| 15 | 0.010 | −28305E | 250 | 6.10 | 5.10 | 4.40 |
| 16 | 0.010 | −27604D | 263 | 6.45 | 5.40 | 4.70 |
| 17 | 0.010 | −10217E | 275 | 6.75 | 5.70 | 5.00 |
| 18 | 0.010 | −27008D | 288 | 7.15 | 6.00 | 5.30 |
| 19 | 0.010 | −10535D | 300 | 7.45 | 6.30 | 5.60 |
| 20 | 0.010 | −11712E | 313 | 7.80 | 6.60 | 5.90 |

Referring once again to FIGURE 2 of the drawings, we shall now describe the pressure measuring portion of the device designated generally at 18. This portion of the device comprises a cylindrical metal can 33 having a conical top portion 25 concentrically mounted on the vertical rod 17 and having formed in its cylindrical side walls a plurality of ports 26, 27, 28 and 29, each of a different predetermined area. Applied over the exterior surface of the can 33 is a thin membrane of frangible covering material 30 of known rupture force. One suitable covering material for this purpose is thin aluminum foil, of the order of .0004 inch in thickness. Such foil has been found consistently to rupture at 1.84 lbs. per square inch.

Accordingly, the larger port 29 in the pressure detector 18 is provided with an area of 7.3 square inches, the membrane over which will rupture if the detection device is subjected to an overpressure of one-quarter pound per square inch. Port 28 is provided with an area of 3.68 square inches over which the foil will rupture at on overpressure of .5 lb. per square inch. Port 26 may be formed with an area of 1.84 square inches so that the foil covering will rupture under a pressure of one pound per square inch, and port 27 may have an area of 1.2 square inches where the foil covering port 27 will not rupture unless the device is subjected to an overpressure of 1.5 lbs. per square inch. In this manner the smaller ports of the pressure detector rupture only when the device is subjected to higher pressures, and consequently the smallest port which has ruptured on any of these detection devices gives a measure of the overpressure at that location. Referring once again briefly to FIGURE 1 of the drawings, it will be seen that detector 14 has only its largest port ruptured, which indicates that a quarter of a pound pressure per square inch has occurred at this site. Detector 10, howanalysis. While the data from only two such indicators is sufficient to provide information required relating to the intensity of incident thermal radiation, horizontal location from which the energy was received, the elevation of the burst, and the overpressure due to the explosion, more accurate measurements may be obtained by averaging the records of several indicators from different locations. Successful operation of the system however requires a relatively small number of the devices to be actually picked up and brought to the shelter.

An example of the manner in which the system may be employed will now be described with reference to FIGURES 6 and 7 of the drawings. As mentioned above, a pair of detectors according to the invention will provide sufficient information to estimate weapon yield, burst height, and ground zero of a nuclear detonation. That is, of course, true, but, associated with any data gathering system are certain measurement errors inherent to the system. One method of reducing errors due to measurement is to collect a large number of measurements and compute their average. A system composed of a relatively few blast recorders has the feature of providing many more estimates of weapon yield, burst height, and ground zero than there are detectors in the system. This is so because estimates are produced from pairs of detectors—two estimates from each pair. The number of pairs of detectors in any given system is determined by the following equation:

(2) $\text{Pairs of detectors in system} = \dfrac{N!}{2!(N-2)!}$ where N is the total number of detectors in the system. The number of estimates of yield, burst height, and ground zero is just double the number of detector pairs in the system or:

$$(3) \quad \frac{N!}{(N-2)!}$$

Thus, for example, if a system is composed of six detectors Equation 3 shows that thirty estimates of weapon yield can be made and similarly thirty estimates of burst height and ground zero. The final estimate of these three quantities is then computed as the average of the thirty estimates derived from the system by pairing detectors.

To better understand how a few detectors according to the invention may be used to generate a large quantity of data, the following illustration is presented. Table 3 represents the basic data associated with each detector. As can be seen from Table 3, these data consist of the location of each detector expressed in terms of degrees latitude, degrees longitude and feet elevation relative to sea level, the recorded measurement of the thermal radiation incident upon each detector, the angular elevation of the burst as shown by each detector, and the horizontal angular direction of the burst relative to the northerly direction.

Figure 6:
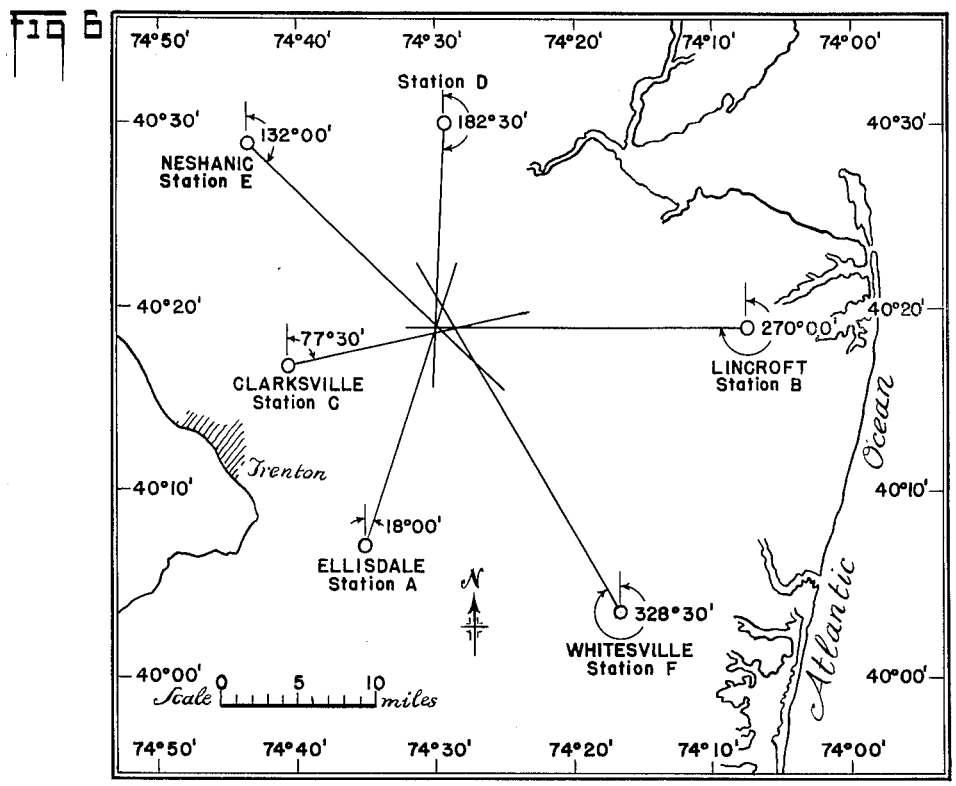
FIGURE 6 is a map of a geographical area showing typical locations of six detection devices as employed in the system of the invention, and useful in understanding the operation of the detection system.

FIGURE 6, shows a map of a portion of the State of New Jersey with six detectors according to the invention located at points designated A through F. The horizontal angular direction of the burst (from each detector) relative to the northerly direction is also shown in FIGURE 6.

into Table 4 as shown by column 5. There are now 30 estimates of slant range.

(6) The next step in this procedure is to determine the burst height above sea level. This is accomplished by using the measured angular burst elevation angles shown in Table 3 with the corresponding values of the estimated horizontal straight line distances between detectors and estimated ground zero points as shown by the data included in column 4 of Table 4. At this point there are 30 estimates of burst height and each is corrected to sea level by adding the elevation of the corresponding detectors as shown in Table 3.

Figure 7:
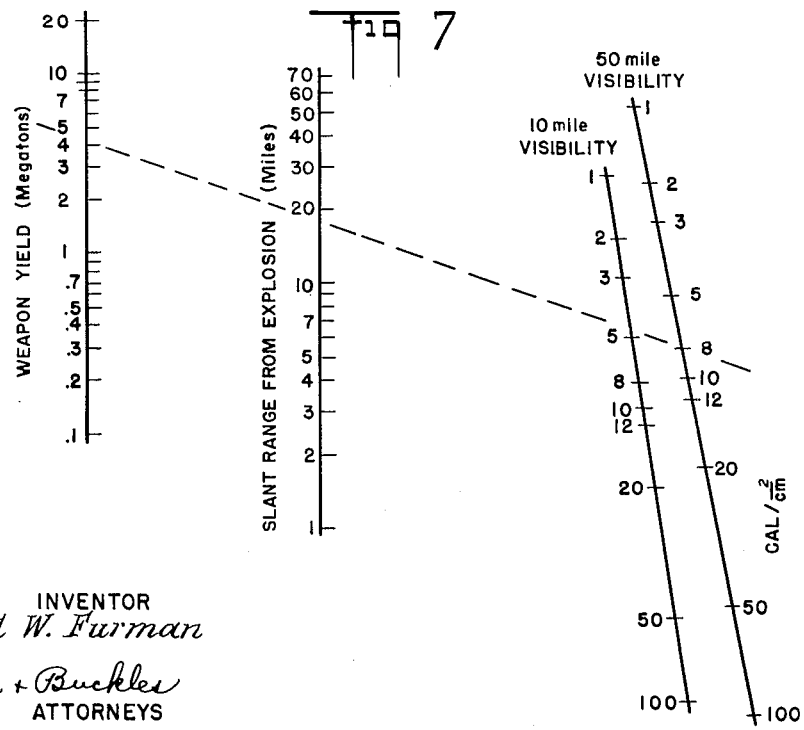
FIGURE 7 is a nomograph useful in determining weapon yield from data recorded by detection devices of the invention.

(7) The nomograph of FIGURE 7 is now used to determine estimates of weapon yield. This nomograph has been developed from data in "The Effects of Nuclear Weapons—1962 Edition" published by the U.S. Atomic Energy Commission, April 1962 and available from the U.S. Government Printing Office. Insofar as I can determine, the nomograph of FIGURE 7 has not heretofore been published in the literature. The estimate of weapon yield is found by entering the nomograph with the measured value of the thermal energy incident upon a detector and each of the estimated slant ranges of Table 4. The data on this nomograph are for air bursts. For a ground burst use 80% of the bomb sizes indicated. A straight edge is used to connect the values of thermal energy and slant range. The extension of the straight edge intersects the vertical column labeled weapon yield at the estimated

*Table 3.—Basic data from a system consisting of six detectors*

| Detector | Location of detector | | | Angular burst elevation | Horizontal angular direction | Thermal radiation (cal./cm.$^2$) |
|---|---|---|---|---|---|---|
| | Lat. | Long. | Elevation (feet above sea level) | | | |
| A | 40°7.9' | 74°35.1' | 100 | 15°26' | 18°0' | 10 |
| B | 40°20' | 74°7.4' | 50 | 11°25' | 270°0' | 5 |
| C | 40°17.9' | 74°40.8' | 50 | 21°10' | 77°30' | 25 |
| D | 40°30.8' | 74°29.5' | 50 | 17°20' | 182°30' | 16 |
| E | 40°30' | 74°43.3' | 100 | 14°8' | 132°0' | 8 |
| F | 40°4.1' | 74°16.5' | 100 | 11°9' | 328°30' | 3 |

The basic data shown in Table 3 is utilized to provide weapon yield, burst height, and location of ground zero by the following procedure.

(1) Form all possible pairs of detectors as shown by column 1 of Table 4.

(2) Locate the geographical position of all detectors on a suitable map, as shown in FIGURE 6. A standard road map available at all automotive service stations is satisfactory for this purpose.

(3) Using the measured horizontal angular direction shown in Table 3, draw an azimuth line from each detector, as shown in FIGURE 6. Each paired combination of detectors will provide an intersection of two such azimuth lines. These intersections represent estimates of ground zero. Record the latitude and longitude of each intersection as shown by columns 2 and 3 of Table 4. For the illustration presented here, there are fifteen estimates of ground zero.

(4) For each pair of detectors the horizontal distance is measured on the map from the location of the detectors in the pair to the estimated point of ground zero. The estimates of the horizontal distance are recorded as shown in column 4 of Table 4. For this illustration 30 such measurements are provided.

(5) Using each estimate of horizontal distance from column 4 of Table 4 and the angular burst elevation measured by the corresponding detectors as shown in Table 3, estimated slant range is calculated and entered value of the weapon yield. For example: In determining the estimated bomb size from detector E in FIGURE 6 using the intersection of the azimuth lines from detectors E and F, the following procedure was employed. From Table 3 it is seen that detector E was exposed to 8 cal./cm.$^2$. From Table 4, column 5, it is seen that the slant range from detector E to the estimated burst point as determined by the intersection of the azimuth lines from detector E and F is 18.5 miles. The dotted line on FIGURE 7 indicates that a thermal pulse of 8 cal./cm.$^2$ at a range of 18.5 miles comes from a 4.1 megaton air burst (the fact that this is an air burst is established in step 6). In this manner 30 estimates of weapon yield are determined and recorded as shown by column 6 of Table 4. It should be pointed out that in this illustration an atmospheric visibility of between 10 and 50 miles was assumed and hence the vertical line identified with 50 mile visibility was used. If the visibility in the vicinity of the detectors is less than 10 miles, then the 10 mile visibility line of FIGURE 7 should be used.

(8) The final step in the procedure is to determine an arithmetic average of the data recorded in Table 4. Thus, the average of columns 2 and 3 is the final estimate of the latitude and longitude of ground zero. The average of column 6 is the final estimate of the weapon yield and the average of column 7 is the final estimate of burst height.

*Table 4.—Calculation of bomb size and burst height from 15 pairs of recordings*

| 1 | 2 | 3 | 4 | 5 | 6 | 7 |
|---|---|---|---|---|---|---|
| Pair of stations | Ground zero | | Horizontal distance to ground zero (miles) | Slant range to blast (miles) | Weapon yield (megatons) | Burst height (feet) |
| | Latitude | Longitude | | | | |
| A<br>B | 40°20.00' | 74°30.00' | 14.5<br>20.1 | 15.04<br>20.5 | 3.5<br>3.5 | 21,200<br>21,450 |
| A<br>C | 40°19.81' | 74°30.35' | 14.4<br>9.9 | 14.95<br>10.6 | 3.4<br>4.0 | 21,100<br>20,250 |
| A<br>D | 40°19.45' | 74°30.24' | 14.0<br>13.3 | 14.56<br>13.94 | 3.2<br>4.2 | 20,500<br>21,950 |
| A<br>E | 40°20.64' | 74°29.76' | 15.3<br>16.3 | 15.9<br>16.8 | 3.9<br>3.5 | 22,400<br>21,700 |
| A<br>F | 40°21' | 74°29.65' | 15.9<br>22.8 | 16.5<br>23.2 | 4.2<br>3.3 | 23,300<br>22,700 |
| B<br>C | 40°20' | 74°28.94' | 19.0<br>11.2 | 19.4<br>12.02 | 3.1<br>5.3 | 20,250<br>22,950 |
| B<br>D | 40°20' | 74°30.24' | 20.2<br>12.4 | 20.6<br>13.0 | 3.5<br>3.5 | 21,550<br>20,450 |
| B<br>E | 40°20' | 74°29.05' | 19.2<br>17.0 | 19.6<br>17.5 | 3.2<br>3.6 | 20,450<br>22,600 |
| B<br>F | 40°20' | 74°28.94' | 19.1<br>21.5 | 19.5<br>21.9 | 3.1<br>2.8 | 20,350<br>22,400 |
| C<br>D | 40°19.74' | 74°30.24' | 9.8<br>12.8 | 10.5<br>13.4 | 4.0<br>3.6 | 20,050<br>21,150 |
| C<br>E | 40°20' | 74°29.05' | 10.9<br>17.0 | 11.7<br>17.5 | 5.1<br>3.6 | 21,950<br>22,600 |
| C<br>F | 40°20' | 74°28.94' | 11.0<br>21.5 | 11.8<br>21.9 | 5.1<br>2.8 | 22,750<br>22,400 |
| D<br>E | 40°20.73' | 74°30.24' | 11.6<br>15.8 | 12.15<br>16.3 | 3.2<br>3.3 | 19,150<br>21,100 |
| D<br>F | 40°21.55' | 74°29.54' | 10.6<br>23.2 | 11.1<br>23.6 | 2.6<br>3.2 | 17,550<br>24,100 |
| E<br>F | 40°19.55' | 74°28.47' | 17.9<br>20.8 | 18.5<br>21.2 | 4.1<br>2.8 | 23,900<br>21,700 |
| Average | 40°20.16' | 74°29.58' | | | 3.607 | 21,530 |

SUMMARY

The detection and recording system of the invention has been described in terms of providing accurate determination of weapon yield, burst height, and ground zero of a nuclear detonation. These quantities in turn may be used to estimate the damage inflicted upon an area by the detonation. The damage estimates are not simple calculations but require very elaborate digital computer programs and communication networks. Such computer programs are presently in use by various agencies of the U.S. Government, including Department of Defense. Referring again to FIGURE 7, it can be seen that the local atmospheric visibility strongly influences the quantity of thermal radiation incident upon a particular locality. The computer estimates of damage depend upon fragmentary information reported as remembered by eyewitnesses after they have reached shelter. The detection system of the present invention has the very important advantage of making actual measurements of thermal radiation and overpressure in the vicinity of the nuclear detonation. These actual recorded measurements are very useful to by-pass existing methods of estimating bomb size, etc., and then subsequently estimating bomb damage from its size. With the actual measurements of thermal radiation and overpressure provided by my invention the bomb damage at a locality can be estimated much quicker and more accurately.

The value of accurate, on-the-spot evaluation of damage suffered by a community from a nuclear detonation cannot be overstated. For example, local officials can make crucial decisions such as evacuate the city or not evacuate, or evacuate part of the city and, if so, which part, and to which area of the city should the community rescue and fire fighting equipment be committed. Similarly, accurate, on-the-spot measurements of thermal radiation and overpressure are of significant value to state and federal governments in deciding how much (if any) state and federal resources should be committed to a city.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A nuclear blast detection and recording device, comprising in combination:
 (A) a blast elevation detector and recorder comprising
  (1) a sphere made of material having low thermal conductivity and
   (a) covered with a heat responsive material,
  (2) a plurality of horizontal parallel circular lines inscribed around said sphere,
 (B) a blast azimuth detector and recorder comprising
  (1) a horizontal disk of heat responsive material
   (a) having a compass rose inscribed thereon,
 (C) a plurality of thermal pulse detection elements,
  (1) each of said elements responsive to permanently change to record a different range of incident temperatures,
 (D) a narrow vertical support
  (1) joining said blast elevation detector and said blast azimuth detector and
  (2) supporting said thermal pulse detection elements,
  (3) said vertical support passing through the center of said azimuth detector compass rose,
whereby the shadow of said support on said blast azimuth detector is imprinted thereon by the heat of a nuclear blast and said elevation detector sphere is discolored by heat to record the azimuth, elevation and temperature of a nuclear blast.

2. A nuclear blast detection and recording device, comprising in combination,
 (A) a blast elevation detector and recorder comprising (1) a sphere made of material having low thermal conductivity and
    (a) covered with a heat responsive material,
(2) a plurality of horizontal parallel circular lines inscribed around said sphere,
(B) a blast azimuth detector and recorder comprising
    (1) a horizontal disk of heat responsive material
        (a) having a compass rose inscribed thereon
(C) a plurality of thermal pulse detection elements
    (1) in the form of metallic rings of relatively high thermal conductivity and low thermal absorption
    (2) each of said rings having a coating responsive to record a different range of incident temperatures,
(D) a pressure detector and recorder comprising,
    (1) a hollow enclosure
        (a) having means forming a plurality of openings of different predetermined areas in the extension wall thereof,
    (2) and a membrane of metal foil stretched over said openings,
(E) a vertical support rod
    (1) supporting and joining said elevation detector, said azimuth detector, said thermal pulse detector and said pressure detector,
    (2) said support rod being secured through the center of said azimuth detector compass rose and
    (3) spacing said elevation detector sphere and said azimuth detector disk whereby said rod shadows a portion of said detector disk to detect and record the elevation, azimuth, temperature and pressure of a nuclear blast.

References Cited by the Examiner

UNITED STATES PATENTS

| 1,344,722 | 6/1920 | Schulz | 73—35 |
| 2,615,249 | 10/1952 | Allard | 250—83 |
| 2,799,167 | 7/1957 | Loconti | 250—83.3 |
| 2,925,498 | 2/1960 | Loconti | 250—83 |

FOREIGN PATENTS 786,198    11/1957    Great Britain.

RALPH G. NILSON, *Primary Examiner.*

JAMES W. LAWRENCE, *Examiner.*